United States Patent [19]

Sato et al.

[11] 3,907,828

[45] Sept. 23, 1975

[54] PROCESS FOR PRODUCTION OF PIVALOLACTONE

[75] Inventors: Mikio Sato; Hiroshi Fujiwara; Asao Takahashi, all of Chiba, Japan

[73] Assignee: Maruzen Oil Company Limited, Nagahoribashi-Siji, Japan

[22] Filed: July 7, 1969

[21] Appl. No.: 339,700

[30] Foreign Application Priority Data

July 6, 1968 Japan.................................. 43-47299

[52] U.S. Cl. ............................................. 260/343.9
[51] Int. Cl.² ...................................... C07D 305/06
[58] Field of Search ................................ 260/343.9

[56] References Cited
UNITED STATES PATENTS

| | | | |
|---|---|---|---|
| 3,291,810 | 12/1966 | Lorenz.............................. | 260/343.9 |
| 3,321,490 | 5/1967 | Burner............................. | 260/343.9 |
| 3,326,938 | 6/1967 | Wagner............................ | 260/343.9 |

FOREIGN PATENTS OR APPLICATIONS 1,140,928  1/1969  United Kingdom

OTHER PUBLICATIONS

Feiser and Feiser, New York, Reinhold, (1961), pp. 366-367.
Chem. Abstract of Fr. Patent 1,514,662, (Feb. 23, 1968), Vol. 70, 1969, 77357 (Date of Pat. relied on).

*Primary Examiner*—Henry R. Jiles
*Assistant Examiner*—Bernard I. Dentz
*Attorney, Agent, or Firm*—Sughrue, Rothwell, Mion, Zinn and Macpeak

[57] ABSTRACT

A novel process for the production of pivalolactone is characterized by dehydrochlorinating monochloropivalic acid in vapor phase in the presence of a catalyst comprising at least one of the metal salts selected from the group consisting of phosphates and pyrophosphates of alkali metals, alkali earth metals, zinc, cadmium, aluminum, thalium, lead, manganese, cobalt and nickel, and chlorides of alkali earth metals, silver copper, thallium, lead and cobalt. Said catalyst may be further combined with an activator selected from the group consisting of the oxides of zirconium, arsenic and rare earth elements.

3 Claims, No Drawings

PROCESS FOR PRODUCTION OF PIVALOLACTONE

BACKGROUND OF THE INVENTION

1. Field of the Invention

The present invention relates to a novel process for the production of pivalolactone from monochloropivalic acid by catalytic dehydrochlorination.

2. Description of the Prior Art

β-lactones, such as pivalolactone, are important industrial materials for producing various useful polymers such as synthetic fibers and synthetic resins, etc., and various methods for the production of β-lactone have been proposed heretofore.

The preparation of β-lactones by the ring closure of β-halogenocarboxylic acid has been reviewed in "Organic Reactions," by Harold E. Zaugg, John Wely and Sons, Inc., New York, Volume 8, Chapter 7. Such discloses a method whereby β-halogenocarboxylic acid is treated at a temperature below 50°C. with aqueous solution of a basic compound such as potassium acetate or sodium hydroxide in the presence of a water-immiscible lactone-extracting solvent such as ethers, chloroform, etc.

In U.S. Pat. No. 3,291,810, Carl E. Lorenz discloses a process which comprises neutralizing monochloropivalic acid, at a temperature in the range of 0°–65°C. with an aqueous solution of a basic compound, e.g., hydroxides of alkali or alkaline earth metals, carbonates or bicarbonates of alkali metals and aliphatic amines, at a temperature in the range of 0°–65°C. to ionize said monochloropivalic acid and then heating it at a temperature in the range of 60°–120°C. to form pivalolactone and metal chloride in the presence of a lactone-extracting solvent such as trichloroethylene, dichloroethylene, nitrobenzene, etc.

In Japanese Pat. No. 444,438, there is described a process which comprises treating monochloropivalic acid at a temperature in the range of 100°–300°C. with various hydroxides of metals such as alkali metals, alkaline earth metals, silver, copper, lead, iron, etc. in the presence of a high boiling solvent such as liquid paraffins, aromatic hydrocarbons, etc.

Each of these prior processes is directed to the liquid phase production of β-lactone by the metal chloride formation reaction between monochloropivalic acid and equivalent amount of a basic compound. In this respect, these prior processes require a large amount of the basic compound reaction material and also entail the separation of a large amount of the byproduct metal chlorides formed in the reaction system. Consequently, these prior processes are very complex and impractical in operation.

In addition, the presence of large amounts of the basic compound which inherently possesses a strong catalytic activity for polymerizing the β-lactone in the reaction zone, eventually results in the polymerization of β-lactone when the product β-lactone is allowed to stand in the reaction system for a long period of time. Consequently, the yield of β-lactone is lowered.

In this connection, it is necessary to use a large amount of an extracting solvent so as to promptly extract and remove the β-lactone as soon as it forms from the reaction zone to prevent polymerization and other side reactions.

Thus, these prior processes are expensive and difficult to operate.

A principal object of this invention is to provide a novel process whereby pivalolactone is produced from monochloropivalic acid by a catalytic dehydrochlorination reaction.

Another object of this invention is to provide a process whereby pivalolactone is produced by catalytically converting monochloropivalic acid in vapor phase in the presence of a metal salt-containing catalyst.

A still further object of this invention is to provide a process for the production of pivalolactone from monochloropivalic acid without the need for using basic compound reaction materials.

A still further object of this invention is to provide a process for the production of pivalolactone from monochloropivalic acid without the need for using a lactone-extracting solvent.

Yet another object of this invention is to provide a process whereby pivalolactone is produced in a simpler and less expensive manner than those attained by the prior art.

These and other objects will become apparent from the following description.

SUMMARY OF THE INVENTION

It has now been found that pivalolactone can be obtained in high yields by catalytically dehydrochlorinating monochloropivalic acid in a vapor phase using a catalyst containing a metal salt selected from the group consisting of phosphates and pyrophosphates of alkali metals, alkali earth metals, zinc, cadmium, aluminum, thallium, lead manganese, cobalt and nickel, and chlorides of alkali earth metals, silver, copper, thallium, lead and cobalt.

DESCRIPTION OF PREFERRED EMBODIMENTS

The following reaction diagram is presented to illustrate the several types of reactions involved in the process of this invention. The main reaction forms pivalolactone by the dehydrochlorination of monochloropivalic acid. The secondary reactions, side reactions of monochloropivalic acid, and decomposition reactions of pivalolactone, form olefins, and byproducts such as unsaturated acids, e.g., tigllic acid, angelic acid and small amounts of of ethyl acrylic acid and methyl vinyl acetic acid; and high boiling components, e.g., chloropivaloxy pivalic acid, etc.

As is noted from the above reaction schemes, the process of this invention is based on a novel reaction involving the vapor phase dehydrochlorination of monochloropivalic acid at an elevated temperature which is entirely different from the reaction of conventional processes involving the reaction of monochloropivalic acid with a basic compound in an inert solvent for form β-lactone and metal chlorides. It is therefore surprising and totally unexpected from the teachings of prior art, that pivalolactone can be efficiently produced at high yield by a simple reaction step comprising the gaseous phase dehydrochlorination of monochloropivalic acid at an elevated temperature in the presence of a small amount of a metal salt catalyst.

The process of this invention is obviously more advantageous than the known processes as the need for using large amounts of basic compounds is eliminated as well as the need for using inert solvents for the extraction of the lactone product.

It is also surprising that the phosphates, pyrophosphates and chlorides of the foregoing particular metals exhibit effective catalyst activity not only for producing

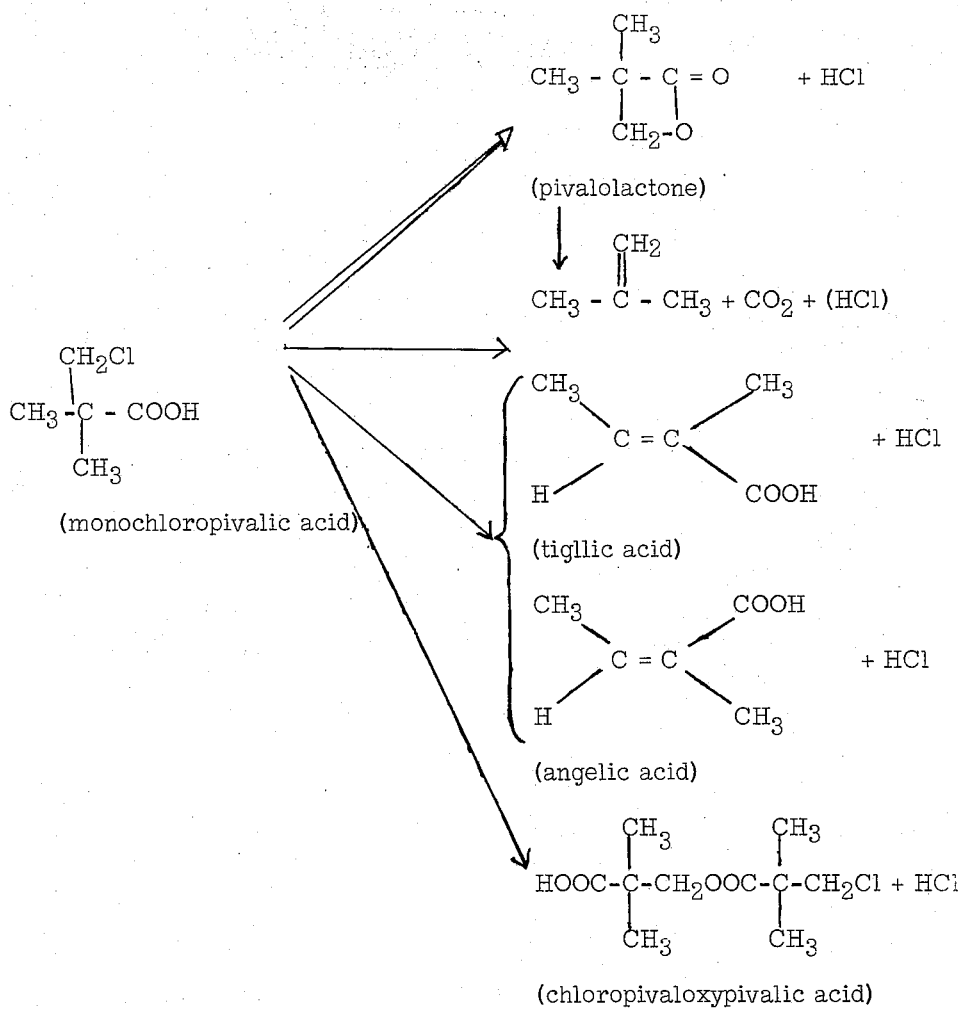

pivalolactone at an increased yield but also for preventing undesirable side reactions or decomposition reactions.

Preferred alkali metals to be employed in the catalyst component of this invention include lithium and sodium. Alkali earth metals to be used in the same catalyst include typically magnesium, calcium, and barium.

Other metal components than alkali or alkali earth metals may be used in the catalyst, e.g., copper, thallium, lead, manganese, cobalt and nickel may be used in their primary metal states, i.e., as Cu(1), Tl(1), Pb(II), Mn(II), Co(II), etc. The metal salts of the catalyst of this invention may be used either singularly or in admixture. These metal salts may be charged to a reactor either in the pure state or supported on various carriers such as kieselguhr, asbestos, pumice, carborundum, alumina, titania, etc. In the case where the metal salts are supported on such carriers, the content of the metal salts in the supported catalyst may be more than 1% by weight, but a content of more than 5% by weight is usually desirable. It is therefore suitable in carrying out the process of this invention to employ the catalyst containing the metal salts within the range of 1–100% by weight, preferably 5–100% by weight.

Any conventional process for preparing the supported metal salt, for instance, by mixing, coating, impregnation and the like may be suitably utilized. It is also preferred to calcine the catalyst in dry air, etc. prior to the reaction.

Since pivalolactone is rather unstable at the high temperatures used in the process of this invention, and often undergoes side reactions or decomposition reactions, it is a matter of great importance to shorten the reaction time so as to assure increased yield of pivalolactone.

It has also been found that the activity of the above catalyst can be further improved by combining the metal salt with a small amount of an oxide selected from the group consisting of zirconium oxide, arsenic oxide and rare earth element oxides.

The use of the activated catalyst, i.e., those containing the above-mentioned oxides has been found to be remarkably effective not only for promoting the reaction but also for improving the selectivity of the reaction to produce pivalolactone.

Preferred oxides of rare earth elements to be employed as the activator in this invention include $CeO_2$, $Nd_2O_3$, $Y_2O_3$ and $Pr_6O_{11}$, etc. The addition of $As_2O_5$ inhibits the side reaction effectively, while the addition of the other oxides of this invention promote the main reaction. These oxides may be added to the catalyst composition either singularly or as a mixture of two or more thereof. These oxides of this invention should be used in an amount of 50% by weight or less based on metal salts in the catalyst. If the amount of oxide is greater than 50%, the side reactions and the decomposition reactions are favored.

The preferred proportion of addition of these oxides ranges from 2 to 6% by weight based on the total catalyst weight.

The addition of the above oxide activators in an amount less than 2% by weight will be insufficient to increase the catalyst activity and the addition of more than 6% by weight will not further increase catalyst activity. However, it is possible to use an amount outside the range mentioned above.

In carrying out the process of this invention, the feed monochloropivalic acid is liquefied by heating above its melting point and then conveyed to a preheating zone and introduced, after being vaporized, to a reaction zone packed with the catalyst. In preheating monochloropivalic acid, care must be taken so as to avoid local heating which causes decomposition, and immediate vaporization must be conducted for maintaining a minimum residence time.

The reaction of this invention may be carried out under either atmospheric or reduced pressure. However, since the dehydrochlorination reaction between two molecules of monochloropivalic acid becomes predominant as the partial pressure of monochloropivalic acid increases which leads to increase the formation of a large volume of high boiling components such as chloropivaloxy pivalic acid, it is desirable to maintain the partial pressure of monochloropivalic acid at less than 300 mm Hg.

It is preferred to use air, hydrogen, nitrogen, argon, helium and the like inert gases as diluents when conducting the reaction under atmospheric pressure or slightly reduced pressure. The reaction of this invention is preferably carried out at a temperature within the range of 250°–350°C. At a temperature of 350°C., the decomposition of monochloropivalic acid and pivalolactone increases with an increasing loss of the material and product; at temperatures below 250°C. the reaction rate is reduced. However, it is possible to conduct the reaction outside the above-mentioned range of the temperature so long as monochloropivalic acid can be kep in vapor phase.

The pivalolactone product is unstable in the temperature range of 250°–350°C., so that the loss by decomposition will increase as the reaction time is lengthened. Accordingly, the reaction time should be shortened so as to obtain pivalolactone with minimum loss. However, the shortened reaction time leads to reduced once through yields of pivalolactone because the degree of the conversion of the feed monochloropivalic acid is lowered to a considerable extent. Alternatively, the increased conversion will enhance the once through yield of pivalolactone to enable efficient production of pivalolactone, but the loss of pivalolactone will at the same time become greater due to the decomposition reactions. It is therefore necessary to determine a practical conversion of monochloropivalic acid after adequately considering such factors as the loss by decomposition, once through yield of pivalolactone and the like. At a conversion below 20%, the loss by decomposition is very low, but the operation becomes inefficient due to a marked decrease of once through yield of pivalolactone. At the conversion above 60%, the yield of pivalolactone is reduced significantly due to predominating decomposition reaction in particular. In this respect, it is desirable to operate the reaction at the conversion of monochloropivalic acid within the range of 20–60%.

It will be understood from the foregoing discussion that the reaction according to the process of this invention should be carried out in the most efficient way with a reaction time as short as possible. Hence, the use of a fixed bed type reactor is ideally suited for this purpose.

The temperature distribution in the catalyst bed is another important factor in carrying out the process of this invention. For instance, the generation of local hot spots in the catalyst bed will often result in the decomposition of feed, monochloropivalic acid and pivalolactone and also the generation of side reactions. It is therefore desirable to conduct the reaction under such conditions that the difference in temperature between the outer wall and central portion of the reactor tube is minimized. A preferred example of the reactor type includes a solid bed-multiple tubular type, but other types of reaction apparatus may as well be used for conducting the process of this invention.

The reaction product obtained in accordance with the process of this invention contains a small amount of byproducts such as unsaturated acids, chloropivaloxy pivalic acid and the like and unreacted monochloropivalic acid. The pivalolactone can be easily separated from its mixture with these byproducts and unreacted monochloropivalic acid by fractional distillation to give a product having a purity as high as 99.9% or more. After the separation of pivalolactone, the unreacted monochloropivalic acid can be separated easily from byproducts by distillation and recycled. The residual chloropivaloxy pivalic acid obtained after the recovery of unreacted monochloropivalic acid may by hydrolyzed with aqueous hydrogen chloride and recovered as monochloropivalic acid.

The catalyst of this invention gradually becomes deactivated after continuous operation for long periods of time with the carbon deposition occuring on its surface. It can easily be regenerated, however, by burning at a temperature of 300°–600°C. in oxygen or an oxygen-containing gas.

As described hereinabove, the process of this invention provides an effective and economical means for producing pivalolactone on an industrial scale. The advantages attained by the process of this invention over prior processes are summarized below.

1. A large quantity of basic compounds which are an indispensable reaction material in prior processes are no longer necessary according to the process of this invention. Consequently, the difficulty in separation of the resulting byproduct metal halides formed in the reaction system is avoided.

2. The desired pivalolactone can be obtained at increased yield because the reaction of this invention is carried out without using basic compounds as a reactant, such compounds exhibiting a strong catalytic activity for the polymerization of the resultant lactone product to increase its loss.

3. The use of a large volume of a reaction solvent or extractant is not necessary since the reaction of this invention is carried out in the vapor phase.

4. The pivalolactone product can be obtained in much higher yields within shorter reaction periods than attained in prior processes since the reaction is carried out in gaseous phase in which the reactivity is much greater than in liquid phase.

The invention will be further described in greater detail by referring to the following examples which are given only for illustrating preferred embodiments of the invention and should in no way be taken as limiting such.

EXAMPLE 1

In the lower part of a hard glass tubular reactor of 20 mm. internal diameter and of approximately 200 cc. internal capacity, there was charged 15 cc. of a catalyst prepared by supporting 10% by weight of lead phosphate on kieselguhr having particle size of 20–30 mesh. Monochloropivalic acid, previously liquefied at 60°C. was fed into the upper part (preheating zone) of said reactor to vaporize at 260°C. 100.0 g. of monochloropivalic acid was passed at the flow rate of 52.5 cc/hr. through said catalyst bed while maintaining the reaction temperature and pressure at 300°C. and 20 mm Hg. respectively. The product so obtained was 91.6 g. The composition of the product was determined by gas chromatographic analysis, to be 17.6% pivalolactone, 0.3% unsaturated acid mixture, 2.0% high boilings (chloropivaloxy pivalic acid) and 80.1% unreacted monochloropivalic acid.

The conversion of monochloropivalic acid was 26.4%, and the selectivity to pivalolactone was 93.9% with the loss of monochloropivalic acid by decomposition of only 2.1% based on the feed monochloropivalic acid.

EXAMPLES 2–32

According to a procedure similar to Example 1, 100.0 g. of monochloropivalic acid was brought into contact with various catalysts under various reaction conditions. The results obtained are reported in Table 1.

TABLE 1

| Ex. No. | Catalyst Metal Salts(wt.%) | Composition Carrier (wt.%) | Catalyst Used (C.C.) | Reaction Temp. (°C.) | Pressure (mmHg) | CPA* Feed Rate (CC/hr) | Product wt. (g) | PL** | Unstd. Acid Mixture | High Boiling Components |
|---|---|---|---|---|---|---|---|---|---|---|
| 2 | $PbCl_2$ (10) | Kieselguhr (90) | 20 | 330 | 20 | 30.0 | 80.8 | 30.3 | 6.5 | 2.8 |
| 3 | $PbCl_2$ (100) | — | 20 | 300 | 20 | 50.0 | 84.7 | 25.8 | 2.4 | 1.5 |
| 4 | $Pb_3(PO_4)_2$ (10) | Kieselguhr (90) | 15 | 300 | 50 | 50.0 | 91.2 | 16.3 | 0.4 | 2.1 |
| 5 | $Pb_3(PO_4)_2$ (10) | Kieselguhr (90) | 15 | 300 | 100 | 54.0 | 90.7 | 15.6 | 0.3 | 1.8 |
| 6 | $Pb_3(PO_4)_2$ (10) | Kieselguhr (90) | 15 | 280 | 20 | 52.5 | 94.9 | 9.9 | 0.2 | 0.6 |
| 7 | $Pb_3(PO_4)_2$ | Pumice (90) | 15 | 340 | 20 | 54.0 | 80.5 | 41.0 | 2.3 | 5.7 |
| 8 | $Pb_3(PO_4)_2$ (10) | Kieselguhr (90) | 15 | 300 | Atm. 1 | 30.0 | 93.2 | 12.5 | 1.2 | 1.5 |
| 9 | $Pb_2P_2O_7$ (10) | Kieselguhr | 20 | 315 | 20 | 72.0 | 82.2 | 22.7 | 0.7 | 0.5 |
| 10 | $Li_3PO_4$ (50) | Asbestos (50) | 15 | 300 | 20 | 25.7 | 86.7 | 24.7 | 1.5 | 3.0 |
| 11 | $Li_3PO_4$ (10) | Kieselguhr (90) | 20 | 315 | 20 | 49.0 | 80.7 | 29.0 | 1.3 | 1.4 |
| 12 | $Li_4P_2O_7$ (10) | Kieselguhr | 20 | 300 | 20 | 53.0 | 86.6 | 22.7 | 1.2 | 1.4 |
| 13 | $Na_3PO_4$ (50) | Asbestos (50) | 15 | 300 | 20 | 23.0 | 91.7 | 14.8 | 2.0 | 2.5 |
| 14 | $Na_4P_2O_7$ (20) | Kieselguhr (80) | 20 | 300 | 20 | 47.0 | 92.1 | 13.1 | 0.3 | 0.6 |

| extension Example No. | Unreacted CPA* | Conversion of CPA* (%) | Selectivity to PL** (mole %) | Loss of CPA* by decomposition (%) |
|---|---|---|---|---|
| 2 | 60.3 | 51.3 | 79.7 | 8.0 |
| 3 | 70.2 | 40.6 | 89.1 | 6.5 |
| 4 | 81.2 | 26.0 | 92.7 | 3.0 |
| 5 | 82.3 | 25.3 | 93.5 | 3.8 |
| 6 | 89.3 | 15.3 | 95.6 | 1.5 |
| 7 | 51.0 | 58.9 | 89.7 | 6.0 |
| 8 | 84.8 | 21.0 | 87.2 | 2.0 |
| 9 | 76.1 | 37.4 | 95.0 | 10.0 |
| 10 | 70.8 | 38.6 | 90.3 | 4.5 |
| 11 | 68.3 | 45.0 | 93.7 | 10.2 |
| 12 | 74.7 | 35.4 | 92.7 | 5.8 |
| 13 | 80.7 | 26.0 | 82.9 | 2.3 |
| 14 | 86.0 | 20.8 | 96.2 | 3.4 |

| Ex. No. | Catalyst Metal Salts(wt.%) | Composition Carrier (wt.%) | Catalyst Used (C.C.) | Reaction Temp. (°C.) | Pressure (mmHg) | CPA* Feed Rate (CC/hr) | Product wt. (g) | PL** | Unstd. Acid Mixture | High Boiling Components |
|---|---|---|---|---|---|---|---|---|---|---|
| 15 | $Co_3(PO_4)_2$ (100) | — | 15 | 270 | 20 | 20.0 | 93.7 | 11.9 | 1.3 | 1.8 |
| 16 | $CoCl_2$ (100) | — | 15 | 260 | 20 | 30.0 | 94.5 | 10.2 | 2.4 | 2.1 |
| 17 | $Co_2P_2O_7$ (100) | Kieselguhr (90) | 20 | 300 | 20 | 50.0 | 85.6 | 23.1 | 2.9 | 1.8 |
| 18 | CuCl (100) | — | 15 | 260 | 20 | 30.0 | 94.5 | 10.5 | 2.0 | 2.2 |
| 19 | AgCl (20) | Asbestos (80) | 15 | 300 | 20 | 30.0 | 92.1 | 16.3 | 2.2 | 1.5 |
| 20 | AgCl (100) | — | 15 | 280 | Atm. 2 | 17.0 | 93.4 | 12.5 | 2.5 | 1.5 |
| 21 | $CaCl_2$ (100) | — | 15 | 300 | 20 | 30.0 | 91.0 | 13.1 | 5.3 | 2.6 |
| 22 | $Mg_3(PO_4)_2$ (10) | Kieselguhr (90) | 20 | 298 | 20 | 58.0 | 88.8 | 22.0 | 0.6 | 4.3 |
| 23 | $Mg_2P_2O_7$ (10) | Kieselguhr (90) | 20 | 300 | 20 | 48.2 | 89.7 | 16.8 | 1.1 | 1.6 |
| 24 | $Ba_3(PO_4)_2$ (40) | Asbestos (60) | 20 | 295 | 20 | 80.2 | 89.3 | 16.8 | 1.1 | 1.4 |
| 25 | $AlPO_4$ (10) | Kieselguhr (90) | 20 | 325 | 20 | 53.0 | 84.8 | 27.6 | 1.7 | 2.7 |

TABLE 1-continued

| Ex. No. | Catalyst Metal Salts(wt.%) | Composition Carrier (wt.%) | Catalyst Used (C.C.) | Reaction Temp. (°C.) | Pressure (mmHg) | CPA* Feed Rate (CC/hr) | Product Composition (wt. %) | | | |
|---|---|---|---|---|---|---|---|---|---|---|
| | | | | | | | Product wt. (g) | PL** | Unstd. Acid Mixture | High Boiling Components |
| 26 | $Al_4(P_2O_7)_3$ (10) | Kieselguhr (90) | 20 | 320 | 20 | 48.0 | 86.8 | 22.0 | 1.3 | 1.4 |
| 27 | $AlPO_4$ (10) | Kieselguhr (90) | 20 | 325 | Atm. 3 | 50.0 | 82.4 | 23.6 | 1.6 | 3.0 |
| 28 | $Zn_3(PO_4)_2$ (40) | Asbestos (60) | 20 | 315 | 20 | 64.3 | 76.5 | 22.0 | 4.8 | 4.0 |
| 29 | $Cd_3(PO_4)_2$ (40) | Asbestos (60) | 20 | 290 | 20 | 64.0 | 87.2 | 19.7 | 3.0 | 1.0 |

| extension Example No. | Unreacted CPA* | Conversion to CPA* (%) | Selectivity of PL** (mole %) | Loss of CPA* by decomposition (%) |
|---|---|---|---|---|
| 15 | 85.0 | 20.3 | 87.4 | 1.5 |
| 16 | 85.3 | 19.4 | 75.6 | 1.0 |
| 17 | 72.2 | 38.2 | 86.5 | 6.0 |
| 18 | 85.3 | 19.4 | 78.1 | 3.5 |
| 19 | 80.0 | 26.4 | 85.3 | 1.5 |
| 20 | 83.5 | 22.0 | 80.0 | 1.5 |
| 21 | 79.0 | 28.1 | 67.2 | 2.4 |
| 22 | 73.1 | 35.1 | 89.9 | 3.3 |
| 23 | 80.5 | 27.8 | 90.3 | 4.2 |
| 24 | 80.7 | 28.0 | 90.9 | 3.4 |
| 25 | 68.0 | 42.4 | 90.9 | 5.8 |
| 26 | 75.3 | 34.6 | 92.0 | 5.7 |
| 27 | 71.8 | 41.0 | 89.1 | 9.7 |
| 28 | 69.2 | 47.1 | 77.1 | 15.5 |
| 29 | 76.3 | 33.4 | 85.1 | 5.5 |

| Ex. No. | Catalyst Metal Salts(wt.%) | Composition Carrier (wt.%) | Catalyst Used (C.C.) | Reaction Temp. (°C.) | Pressure (mmHg) | CPA* Feed Rate (CC/hr) | Product wt. (g) | PL** | Unstd. Acid Mixture | High Boiling Components |
|---|---|---|---|---|---|---|---|---|---|---|
| 30 | $MN_2(PO_4)_3$ (40) | Asbestos (60) | 20 | 285 | 20 | 84.0 | 87.7 | 18.4 | 3.2 | 1.9 |
| 31 | $Ni_3(PO_4)_2$ (40) | Asbestos (60) | 20 | 310 | 30 | 96.0 | 84.7 | 14.1 | 3.6 | 2.5 |
| 32 | $Tl_3PO_4$ (40) | Asbestos (60) | 20 | 300 | 20 | 60.0 | 79.6 | 21.6 | 0.7 | 1.8 |

| extension Example No. | Unreacted CPA* | Conversion to CPA*(%) | Selectivity of PL**(mole %) | Loss of CPA* by decomposition (%) |
|---|---|---|---|---|
| 30 | 76.5 | 32.9 | 82.1 | 5.1 |
| 31 | 79.8 | 32.4 | 75.0 | 9.4 |
| 32 | 75.9 | 39.6 | 93.5 | 13.7 |

1. Hydrogen was introduced at the flow rate of 54.0 l/hr. as diluent
2. Nitrogen was introduced at the flow rate of 28.8 l/hr. as diluent
3. Nitrogen was introduced at the flow rate of 23.0 l/hr. as diluent
*monochloropivalic acid
**pivalolactone

EXAMPLES 33–43

According to a procedure similar to Example 1, 100.0 g. of monochloropivalic acid was reacted under various conditions by using various catalysts containing metal salts together with the oxide activators selected from the class consisting of zirconium oxide, arsenic oxide, cerium oxide and neodyminum oxide. The results obtained are given in Table 2.

For the purpose of illustrating the effect of oxides, the results of Example 11 and 22 in which the catalyst contains no oxide are compared with those of corresponding Examples 37 and 40 in which the catalyst contains oxides. The space time yield (the amount of pivalolactone from the reactor per unit volume of catalyst per unit time; referred to as STY in Table 3) in these Examples are given in Table 3.

TABLE 3

| | STY (g/cc/hr.) | | STY |
|---|---|---|---|
| Example 11 | 0.64 | Example 37 | 0.94 |
| Example 22 | 0.63 | Example 40 | 0.83 |

Judging from the foregoing results, it will be noted that the addition of oxides (excluding $As_2O_5$) into the catalyst enhances the catalyst activity to promote the reaction rate, and consequently the space time yield considerably increases. Comparing the results of Example 22 with that of Example 41, it also will be noted that the addition of $As_2O_5$ is efficient in increasing the selectivity to pivalolactone.

TABLE 2

| Ex. No. | Catalyst Metal Salts (wt.%) | Composition Carrier (wt.%) | Oxide(wt.%) | | Catalyst Used (C.C.) | Reaction Temp(°C.) | Pressure (mmHg) | CPA* Feed Rate (CC/hr) | Product Wt. (g.) |
|---|---|---|---|---|---|---|---|---|---|
| 33 | $Pb_2P_2O_7$ (10) | Kieselguhr (85) | $Nd_2O_3$ | (5) | 20 | 300 | 20 | 75.0 | 86.5 |
| 34 | $Pb_3(PO_4)_2$ (10) | Kieselguhr (86) | $CeO_2$ | (4) | 20 | 300 | 20 | 70.6 | 82.3 |
| 35 | $Na_3PO_4$ (10) | Kieselguhr (85) | $Nd_2O_3$ | (5) | 20 | 300 | 20 | 31.5 | 87.3 |
| 36 | $Na_4P_2O_7$ (10) | Kieselguhr (85) | $CeO_2$ | (5) | 20 | 300 | 20 | 60.5 | 87.4 |

TABLE 2-continued

| Ex. No. | Catalyst Metal Salts (wt.%) | Composition Carrier (wt.%) | Oxide(wt.%) | | Catalyst Used (C.C.) | Reaction Temp(°C.) | Pressure (mmHg) | CPA* Feed Rate (CC/hr) | Product Wt. (g.) |
|---|---|---|---|---|---|---|---|---|---|
| 37 | Li₃PO₄ (10) | Kieselguhr (85) | Nd₂O₃ | (5) | 20 | 300 | 20 | 70.0 | 81.9 |
| 38 | Li₃PO₄ (10) | Kieselguhr (85) | AS₂O₅ | (5) | 20 | 300 | 20 | 75.6 | 87.4 |
| 39 | Li₃PO₄ (10) | Kieselguhr (85) | ZrO₂ | (5) | 20 | 305 | 20 | 59.2 | 83.2 |
| 40 | Mg₃(PO₄)₂ (10) | Kieselguhr (86) | CeO₂ | (4) | 20 | 300 | 20 | 58.0 | 78.8 |
| 41 | Mg₃(PO₄)₂ (10) | Kieselguhr (86) | AS₂O₅ | (4) | 20 | 300 | 20 | 59.3 | 84.0 |
| 42 | Mg₂P₂O₇ (10) | Kieselguhr (86) | Nd₂O₃ | (4) | 20 | 300 | 20 | 48.5 | 85.0 |
| 43 | Co₃(PO₄)₂ (10) | Kieselguhr (86) | Nd₂O₃ | (4) | 20 | 295 | 20 | 60.0 | 81.8 | extension

| Example No. | PL** | Product Composition (wt.%) Unstd. Acid Mixture | High Boiling Components | Unreacted CPA* | Conversion of CPA*(%) | Selectivity to PL** (mole %) | Loss of CPA* by decomposition (%) |
|---|---|---|---|---|---|---|---|
| 33 | 22.6 | 1.1 | 1.0 | 75.2 | 35.0 | 93.7 | 5.9 |
| 34 | 27.8 | 1.7 | 1.8 | 68.7 | 43.5 | 92.0 | 8.6 |
| 35 | 20.5 | 2.9 | 2.3 | 74.3 | 35.2 | 84.3 | 5.0 |
| 36 | 18.5 | 1.2 | 0.5 | 79.8 | 30.3 | 93.0 | 6.3 |
| 37 | 29.3 | 2.0 | 1.9 | 66.8 | 45.3 | 91.2 | 8.6 |
| 38 | 19.9 | 0.1 | 0.9 | 79.1 | 30.8 | 97.5 | 6.0 |
| 39 | 27.5 | 1.9 | 1.8 | 68.8 | 42.7 | 91.3 | 7.6 |
| 40 | 32.1 | 3.0 | 2.2 | 62.5 | 50.7 | 88.2 | 10.8 |
| 41 | 25.1 | 0.2 | 1.2 | 74.5 | 38.2 | 97.2 | 7.9 |
| 42 | 24.2 | 2.1 | 2.5 | 71.2 | 39.5 | 88.3 | 6.5 |
| 43 | 30.0 | 4.4 | 2.5 | 63.2 | 48.3 | 84.5 | 7.7 |

We claim:
1. A process for the production of pivalolactone which comprises dehydrochlorinating monochloropivalic acid in vapor phase in the presence of a catalyst containing a metal salt selected from the group consisting of phosphates and pyrophosphates of lithium and sodium.
2. The process of claim 1 where said catalyst further comprises, in addition to said metal salt, an activator selected from the group consisting of $CeO_2$, $Nd_2O_3$, $Y_2O_3$ and $Pr_6O_{11}$, in an amount of at most 50% by weight of said metal salt.
3. The process of claim 1 where said activator is present in an amount of 2 to 6% by weight based on the total catalyst weight.

* * * * *

UNITED STATES PATENT AND TRADEMARK OFFICE
CERTIFICATE OF CORRECTION

PATENT NO. : 3,907,828
DATED : September 23, 1975
INVENTOR(S) : Mikio Sato; Hiroshi Fujiwara; Asao Takahashi It is certified that error appears in the above-identified patent and that said Letters Patent are hereby corrected as shown below:

IN THE HEADING:

Delete "Appln. No. 339,700" and insert therefor
--Appln. No. 839,700--

Signed and Sealed this tenth Day of February 1976

[SEAL]

Attest:

RUTH C. MASON
Attesting Officer

C. MARSHALL DANN
Commissioner of Patents and Trademarks